United States Patent [19]

Sweeney

[11] 3,927,028

[45] Dec. 16, 1975

[54] SULTONE EXTRACTION PROCESS
[75] Inventor: William A. Sweeney, Larkspur, Calif.
[73] Assignee: Chevron Research Company, San Francisco, Calif.
[22] Filed: Sept. 5, 1974
[21] Appl. No.: 502,999

Related U.S. Application Data
[63] Continuation-in-part of Ser. No. 874,421, Nov. 5, 1969, abandoned.

[52] U.S. Cl. .............................................. 260/327 S
[51] Int. Cl.² ........................................ C07D 327/02
[58] Field of Search ................................ 260/327 S

[56] References Cited
UNITED STATES PATENTS
3,164,609  1/1965   Voss et al. ....................... 260/327 S
3,255,240  6/1966   Wolfram et al. ................. 260/327 S
3,409,637  11/1968  Eccles et al. .................... 260/327 S
3,519,645  7/1970   Contat et al. .................... 260/327 S
3,787,441  1/1974   Kennedy et al. ................. 260/327 S OTHER PUBLICATIONS
Willems, Bull. Soc. Chim. Belges 64: 747–771 (1955).

Primary Examiner—Sherman D. Winters
Attorney, Agent, or Firm—G. F. Magdeburger; John Stoner, Jr.; J. T. Brooks

[57] ABSTRACT

Hydrocarbyl sultones containing from about 8 to 30 carbon atoms are extracted from a sulfur trioxide-olefin reaction mixture by adding to the mixture a critical amount of water and a water-soluble, polar organic cosolvent, and extracting the sultones from the resulting mixture with a hydrocarbon solvent.

11 Claims, No Drawings

SULTONE EXTRACTION PROCESS

CROSS-REFERENCE TO RELATED APPLICATION

This application is a continuation-in-part of U.S. application Ser. No. 874,421, filed Nov. 5, 1969, and now abandoned.

BACKGROUND OF INVENTION

1. Field of the Invention

The present invention is concerned with a process for producing hydrocarbyl sultones and, more particularly, is concerned with a method of isolating or recovering sultones by their extraction from a sulfur trioxide-olefin reaction product.

2. Description of the Prior Art

Hydrocarbyl sultones have been produced by a variety of methods. Included among these methods are the distillation of sultones from a mixture of organic hydroxy-sulfonic acid with a strong acid, such as sulfuric (U.S. Pat. No. 3,146,242), the dehydration of a hydroxy alkane sulfonic acid with an inert gas giving cyclization (U.S. Pat. No. 3,115,501), the splitting off of the carboxylic group from an acyloxy-sulfonic acid (U.S. Pat. No. 3,357,992), and the preparation of 3-methyl-1,3-propane sulfonic acid.

Processes have also been disclosed for producing sultones by the direct reaction of sulfur trioxide and olefins containing one or more methylene groups adjacent to the ethylenic group. U.S. Pat. No. 3,164,608 discloses a process for producing sultones by the reaction of 1 mol of an alpha-olefin having the formula:

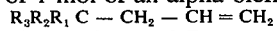

wherein $R_1$, $R_2$, and $R_3$ are selected from the group consisting of hydrogen and aliphatic hydrocarbon radicals, the olefin containing from about 4 to 30 carbon atoms with from about 1 to about 3 mols of sulfur trioxide at a temperature between about −30°C. and about 80°C., and recovering the sultones from the reaction mixture by directly distilling them under vacuum, and subjecting the reaction mixture to aqueous hydrolysis, separating the hydroxy sulfonic acids, and forming sultones from the hydroxy sulfonic acids by splitting off water by either directly distilling water therefrom or distilling water therefrom in the presence of an entrainment agent. This process is said to be particularly applicable to those compounds in which the starting olefin contains from 4 to 8 carbon atoms. The higher sultones are disclosed as being purifiable by reprecipitation or recrystallization. Alternatively, a process of separation is described comprising partial neutralization of the raw reaction mixture subsequent to hydrolysis followed by direct distillation of the sultones from the mixture.

U.S. Pat. No. 3,164,609 discloses a process for sulfonation of the same olefins as disclosed in U.S. Pat. No. 3,164,608, employing a ratio of 0.1 to 0.8 mols of sulfur troxide per mol of olefin. It is disclosed that the sultone products of less than 10 carbon atoms may be distilled directly from the reaction mixture as described in U.S. Pat. No. 3,164,608. It is further disclosed that, in the case of sultones with more than 10 carbon atoms, the sultone crystallizes out of the reaction mixture and may be isolated by filtration or by centrifugation. It is stated that, in many cases, the raw reaction mixture may be employed in forming sultone reaction products.

While the foregoing method of employing simply the raw reaction mixture may be suitable for some purposes, it is often desirable that a pure sultone be produced and in such case the only known practicable methods of producing the pure compounds are those described involving relatively complicated procedures which involve conversion and reconversion of the sultones, as well as distillation, centrifugation, crystallization and recrystallization. It is therefore advantageous to provide a method of producing sultones with considerably less complicated procedures requiring much reduced effort and equipment.

SUMMARY OF THE INVENTION

An improved process for the production of hydrocarbyl sultones is provided which comprises extracting the sultones from the reaction product of sulfur trioxide with a mono-olefinic hydrocarbon containing a total of 8 to 30 carbon atoms. To the reaction product mixture is added water and a water-soluble polar organic solvent containing from 1 to 4 carbon atoms. The water is added in a weight ratio relative to the reaction mixture of from 1:3 to 3:1. The organic polar cosolvent is employed in the amount of from 1:1 to 4:1 in a cosolvent-water weight ratio. After mixing the water and cosolvent with the sulfonation product, the sultone is extracted from the mixture with a hydrocarbon solvent.

The entire mixing and extraction steps are carried out at temperatures significantly lower than the digestion and distillation processes of the prior art, usually in the range of 10° to 80°C., preferably at temperatures in the range of 20° to 60°C.

After extraction with a hydrocarbon solvent and removal, the solvent is stripped from the hydrocarbonaceous phase, leaving the desired sultones. While the sultone is generally of such purity that it may be employed directly for many purposes, if further purification is desired, this may be accomplished by dissolution in and recrystallization from a suitable solvent.

DETAILED DESCRIPTION OF THE INVENTION

The olefins suitable for treatment in accordance with the present invention are alkyl or alkaryl. The materials which are particularly suitable are straight-chain alpha olefins from wax cracking, straight-chain alpha olefins produced by Ziegler polymerization of ethylene, internal straight-chain olefins prepared by catalytic dehydrogenation of n-paraffins, and internal straight-chain olefins prepared by chlorination and dehydrochlorination of n-paraffins. The olefins may contain from 8 to 30 carbon atoms, usually 10 to 24 carbon atoms, and most preferably from about 13 to 22 carbon atoms.

The water-soluble, polar, organic cosolvents which are employed in the extraction process of this invention are preferably low molecular weight, volatile alcohols or ketones. Suitable alcohols include methanol, ethyl alcohol, n-propyl alcohol, isopropyl alcohol, n-butyl alcohol, isobutyl alcohol, sec.-butyl alcohol, and tert.-butyl alcohol. The ketones which may be utilized include acetone and methyl ethyl ketone. Methanol, ethanol and acetone are the preferred cosolvents.

The hydrocarbon solvents which are used to extract the sultones from the sulfonation product-water-polar organic cosolvent mixture may be any of the generally used hydrocarbon solvents, aliphatic, aromatic or mixed. Thus, for use at atmospheric pressure, hydrocarbons of from about 5 to 12 carbon atoms are suitable. Examples of the materials which may be employed are aliphatic materials such as pentane, hexane, octane, nonane, decane, undecane and dodecane, and aromatic materials, such as benzene, toluene, xylene, etc. A particularly useful solvent is petroleum ether, a mixture of aliphatic hydrocarbons boiling between 40° and 70°C. and containing from about 5 to 6 carbon atoms per molecule.

In the sulfonation of the olefins, the amount of $SO_3$ utilized may be varied from about 0.5 to 3 mols per mol of olefin but is usually within the range of 0.95 to 1.25 mols of $SO_3$ per mol of olefin and preferably in the range of 1:1 to 1.15:1. An increased formation of the disulfonated products is observed at higher $SO_3$:olefin ratios. Disulfonation may be reduced by carrying the sulfonation reaction only to partial conversion of the olefin, for example, by using an $SO_3$:olefin ratio of less than 1, and subsequently removing the unreacted olefins by a deoiling process. In the deoiling process, the unreacted olefins may be removed by extracting the neutralized final sulfonate product with a hydrocarbon, such as pentane.

In order to obtain a product with good color, the $SO_3$ employed in the sulfonation reaction is generally mixed with an inert diluent or with a modifying agent. Inert diluents which are satisfactory for this purpose include air, nitrogen, $SO_2$, dichloromethane, etc. The volume ratio of $SO_3$ to diluent is usually in the range of 1:100 to 1:1. In some cases, the reaction of olefins with $SO_3$ can be carried out under subatmospheric pressure without a diluent. The reaction may be carried out in a stirred vessel or preferably in a falling film reactor.

As is known in the art, immediate removal of the sultone will yield a material having primarily a 1,3 configuration; subjecting the mixture to prolonged heating will yield primarily 1,4 sultone. Since little or no heating is necessary to carry out the process of this invention, either isomer may be produced with facility.

In carrying out the extraction process of the invention, the olefin and sulfur trioxide are reacted as described above, and water is then added to the reaction mixture to produce a water-reaction mixture weight ratio in the range of 1:3 to 3:1, preferably 1:3 to 2:1, and most preferably 1:2 to 2:1. The water-soluble polar organic cosolvent may be added initially with the water or, in a preferred embodiment, the water is added cold, alone, in a quenching step to cool the product of the sulfonation reaction.

In either case, it is only critical that, at the time of the subsequent extraction with hydrocarbon, the ratio of the cosolvent to water in the mixture be maintained within specified limits, from 4:1 to 1:1, preferably 3.5:1 to 2.5:1 by weight. If the ratio is above 4:1 during the subsequent extraction, only one phase will be formed, and if the ratio is less than 2:1 an emulsion will be formed, hindering the extraction step. The extraction can be performed using increased amounts of the proper mixture of water and cosolvent so that the ratio of water to reaction mixture would be above the 3:1 stated above but this would be uneconomic and disadvantageous for subsequent removal of solvent.

The extraction from the sulfonation product, water, organic cosolvent mixture is accomplished by conventional means. Thus both countercurrent or cocurrent extraction techniques may be employed.

The amount of hydrocarbon extracting agent to be employed must be sufficient to dissolve all or most of the sultone present in the reaction mixture. The relative amount necessary for any given extraction is dependent upon the sultone concentration and upon the solubility of the sultone in admixture with the organic sulfonic acids present. In general, the higher molecular weight sultones, i.e., those having over 10 carbon atoms, will require less extracting agent than those of lower molecular weight. For most extractions, the total quantity of extracting agent will be within the range of 100 to 1000 parts per 100 parts of reaction mixture.

In a typical batch extraction, the appropriate quantities of the sulfonation reaction product, water, polar cosolvent, and the hydrocarbon extractant are combined, and the entire mixture is agitated rapidly for a short period of time. The agitation time usually need not be more than 5 minutes, and a time of from 0.5 to 2 minutes is preferred. After phase separation, the hydrocarbon phase is removed by conventional methods.

When countercurrent or cocurrent extraction methods are employed, care must be used to maintain the proper ratio of organic polar cosolvent to the water in the mixture as some cosolvent will be removed with the hydrocarbon extractant. This may be accomplished by the continuous addition of a small amount of the cosolvent during the extraction.

After removal of the hydrocarbon layer, the sultone is recovered by conventional techniques, e.g., removal of the hydrocarbon extractant from the solution by distillation at atmospheric or under reduced pressure.

The following examples are illustrative of the processes of this invention. The examples are simply illustrative, and are nonlimiting.

EXAMPLE 1 — Sultone from Hexadecene-1

A sample of hexadecene-1 (99%, Humphrey Chemical Company) was sulfonated with sulfur trioxide in a falling film reactor unit at a mol ratio of 1:20 $SO_3$/hexadecene-1. The product of the sulfonation reaction was heated at 80°–90°C. for four hours in order to isomerize the 1,3-sultone to 1,4-sultone.

A 250 g. portion of the isomerized sulfonation product was dissolved in 250 g. of water and 594 g. of acetone. This solution was stirred and extracted successively with 1,750 ml., 500 ml., and 500 ml. of petroleum ether.

The three extracts were combined and most of the petroleum ether was removed by distillation. Finally the residual petroleum ether and acetone were removed by evaporation.

The product was dissolved in petroleum ether (1 g. of product in 6 ml. of ether), washed with 5 volume percent of 50/50 190 proof alcohol/0.2 N NaOH, and then with 3 volume percent of 50/50 190 proof alcohol/water. The product was allowed to stand overnight to crystallize, and the crystals were vacuum filtered. The crystals were redissolved in petroleum ether (1 g./6 ml.), recrystallized overnight, and refiltered in a similar manner. The product was dried in a vacuum oven at 35°–40°C. The melting point and infrared spectrum of each batch was obtained. Recovery of the recrystallized 1,4-sultone averaged about 40% (100 g. per batch) of the isomerized sulfonation product. A composite of 16 batches treated in a similar manner gave the following results:

| | |
|---|---|
| Melting Point, °C. | 59.6–60.9 |
| Purity (Differential Scanning Colorimetry), Mol % | 97.45 |
| Surface Active Material*,% | Less than 0.2 |

*Determined by the method of House and Darragh, *Analytical Chemistry* 26, 1492 (1954).

EXAMPLE 2

The reactor used for this sulfonation consisted of a continuous falling film type unit in the form of a vertical water-jacketed tube. Both the olefin and the $SO_3$-air mixture were introduced at the top of the reactor and flowed concurrently down the reactor. At the bottom the sulfonated product was separated from the air stream.

The feed was a straight-chain 1-olefin blend produced by cracking highly paraffinic wax and having the following composition by weight: 1% tetradecene, 27% pentadecene, 29% hexadecene, 28% heptadecene, 14% octadecene, and 1% nonadecene.

This material was charged to the top of the abovedescribed reactor at the rate of 306 lbs./hr. At the same time 124.2 lbs./hr. of $SO_3$ diluted with air to 3% by volume concentration of $SO_3$ was introduced into the top of the reactor. The reactor was cooled with water to maintain the temperature of the effluent product within the range of 40°–46°C. The average residence time of the reactants in the reactor was less than two minutes.

A 32 pound portion of the product of the sulfonation reaction was added to 2-gallons of water and 7 gallons of formula 3A alcohol.

A 1,000 g. portion of the sulfonation product-water-alcohol mixture, was extracted successively with petroleum ether in 2,000 ml., 500 ml., and 500 ml. increments. The increments were combined, washed with 150 ml. of a 50/50 mixture of 190 alcohol and 0.3 N NaOH and then with 150 ml. of 50/50 190 ethyl alcohol/water. The petroleum ether and the remaining solvents were removed by evaporation at atmospheric pressure and finally in a vacuum oven at 40°–45°C. Analysis of the product gave the following result:

| | |
|---|---|
| Surface Active Material*, % | 6 |
| Sultones, % | 64 |
| Unreacted Hydrocarbon, % | 29 |

*Determined by the method of House and Darragh, *Analytical Chemistry* 26, 1492 (1954).

EXAMPLES 3–8

5 g. portions of the sulfonation product of Example 1 were mixed with various amounts of water and acetone cosolvent as follows and each sample was extracted with a 35 ml. portion of 30°–60°C. petroleum ether:

TABLE I

Separation of Sultones with Acetone-Water Mixtures

| Example | Water Volume, ml. | Acetone Volume, ml. | Sultone Recovered, g. |
|---|---|---|---|
| 3 | 0.25 | 0.875 | None |
| 4 | 0.5 | 1.75 | None |
| 5 | 1.0 | 3.5 | None |
| 6 | 2.5 | 8.75 | 2.6 |
| 7 | 5.0 | 17.5 | 2.7 |
| 8 | 10.0 | 35 | 3.6 |

In Examples 3 thru 5 no sultones were recovered because no separation of layers occurred.

The sultone collected in Examples 6 and 7 was a white solid identified by Infrared and Nuclear Magnetic Resonance spectroscopy as being hexadecane sultone free of sulfonic acids; the sultone of Example 8 was off-white.

EXAMPLES 9–13

3.6 g. portions of the sulfonation product of Example 2 were mixed with 1.4 ml. water and 5 ml. of cosolvent and then each sample was extracted with 20 ml. pentane as follows:

TABLE II

Separation of Sultone with Mixtures of Water and Various Polar Organic Cosolvents

| Example | Cosolvent | Volume of Upper Layer ml. | Sultone Recovered Weight, g. | Purity* |
|---|---|---|---|---|
| 9 | methanol | 19 | 1.5 | good |
| 10 | ethanol | 19 | 1.2 | good |
| 11 | isopropanol | 21 | 2.1 | poor |
| 12 | acetone | 21 | 2.1 | good |
| 13 | diethyl ether | 5 | 0.3 | good |

*Visual appearance and absence of sulfonic acid peak at 1040 $cm^{-1}$ in the infrared spectrum.

These examples show that methanol, ethanol and acetone are preferred over isopropanol because the recovered sultone is more cleanly separated from the sulfonic acids. Diethyl ether was not satisfactory because most of the pentane extractant was incorporated in the lower sulfonic acid-containing layer. When similar experiments were performed without adding the polar cosolvent but with added aromatic hydrocarbons such as benzene or toluene or additional pentane, emulsions formed and very poor separations results. When the ratio of the cosolvent to water was increased substantially, no separation of layers occurred.

These results show that the sultones may be extracted from the sulfonated olefin mixtures with facility by the method of this invention without going through highly complicated procedures.

As will be evident to those skilled in the art, various modifications of the present process can be made or followed in the light of the foregoing disclosure and discussion without departing from the spirit or scope of the disclosure or the scope of the following claims.

I claim:

1. A process for recovering sultones from the reaction mixture produced by reacting sulfur trioxide with a monoolefinic hydrocarbon containing a total of 8 to 30 carbon atoms, said process comprising the steps of:
   1. adding water to said reaction mixture in a weight ratio relative to the weight of the reaction mixture of from 1:3 to 3:1;
   2. adding to said reaction mixture a water-soluble polar, organic cosolvent having from 1 to 4 carbon atoms in a weight ratio relative to water of from 4:1 to 1:1;
   3. extracting the mixture resulting from Steps (1) and (2) with a hydrocarbon solvent; and
   4. removing the hydrocarbon solvent from the product of Step (3) to produce a hydrocarbyl sultone;

wherein Steps (1) and (2) may be performed in any order or simultaneously and wherein the temperature of the reaction mixture during Steps (1), (2) and (3) is from about 10° to 80°C.

2. The process of claim 1 wherein the temperature of the reaction mixture in Steps (1), (2) and (3) is maintained in the range of about 20° to 60°C.

3. The process of claim 1 in which the olefin is substantially straight chain.

4. The process of claim 1 in which the water in Step (1) is added in a weight ratio relative to the weight of the reaction product of from 1:3 to 2:1.

5. The process of claim 4 in which the ratio is from 1:2 to 1:1.

6. The process of claim 1 in which the water-soluble, polar, organic cosolvent is a ketone or an alcohol.

7. The process of claim 5 in which the ratio of polar-organic cosolvent to water is from 3.5:1 to 2.5:1.

8. The process of claim 1 in which the olefin contains from 10 to 24 carbon atoms.

9. The process of claim 1 in which the hydrocarbon solvent is employed in the amount of 100 to 1000 parts by weight per 100 parts of the reaction mixture.

10. The process of claim 8 in which Step (4) is performed by evaporating the hydrocarbon solvent from the mixture.

11. The process of claim 8 in which the hydrocarbon solvent is petroleum ether.

* * * * *